United States Patent
Melen et al.

(10) Patent No.: US 6,631,205 B1
(45) Date of Patent: Oct. 7, 2003

(54) STEREOSCOPIC IMAGING IN A PORTABLE DOCUMENT FORMAT

(75) Inventors: Roger D. Melen, Los Altos Hills, CA (US); Kory D. Christensen, Santa Clara, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/229,596

(22) Filed: Jan. 13, 1999

(51) Int. Cl.$^7$ .......................... G06T 9/00; G06T 15/00; G06T 17/00
(52) U.S. Cl. ........................ 382/154; 382/232; 715/513
(58) Field of Search .................... 382/154, 232–253; 396/324–331; 345/419, 420–427; 348/43; 359/458, 464; 707/513; 715/513, 526, 520

(56) References Cited

U.S. PATENT DOCUMENTS 6,061,083 A * 5/2000 Aritake et al. ................ 348/51

OTHER PUBLICATIONS

3DTV, an archived website http://www.3dmagic.com, as captured and archived by the "wayback machine" at http://web.archive.org on the date of Dec. 3, 1998, pages numbered by the examiner as 1–36.*
StereoGraphics Developers' Handbook, produced and distributed by the StereoGraphics Corporation, pp. 1–65, copyright 1997.*
Jon Siragusa et al., General Purpose Stereoscipic Data Descriptor, produced and distributed by the Vrex, Inc., pp. 1–6, copyright 1997.*
Web pages at http://ray3D.com, as captured and archived by the "wayback machine" at http://web.archive.org on the date of Dec. 18, 1996; The documentation provided by the examiner is sequentially numbered at the bottom of each page, from 1–15.*
Web pages at http://www.3dexpo.com, as captured and archived by the "wayback machine" at http://web.archive.org on the date of Dec. 1, 1998; The documentation provided by the examiner is sequentially numbered at the bottom of each page, from 1–19.*
Web pages at http://vrex.com/depthcharge/, as captured and archived by the "wayback machine" at http://web.archive.org on the date of Dec. 5, 1998; The documentation provided is sequentially numbered at the bottom of each page, from 1–16.*
Portable Document Format Reference Manual, Version 1.2 Adobe Systems Incorporated, Nov. 27, 1996, pp. 1–394, ISBN 0–201–62628–4.

* cited by examiner

Primary Examiner—Brian Werner
(74) Attorney, Agent, or Firm—Fitzpatrick, Cella, Harper & Scinto

(57) ABSTRACT

A computer-implemented method for representing a stereoscopic image (204) in a portable document format encoded file (112) includes receiving at least two component images (110A–B) combinable to form the stereoscopic image (204); encoding the component images (110A–B) in a portable document format; associating each of the component images (110A–B) with a stereoscopic indicator (302); and storing the component images (110A–B) and associated stereoscopic indicators (302) in the encoded file (112). A computer implemented method for displaying a stereoscopic image (204) represented in a portable document format encoded file (112) includes identifying in the encoded file (112) at least two component images (110A–B) combinable to create the stereoscopic image (204); combining the component images (110A–B) to create the stereoscopic image (204); and displaying the stereoscopic image (204) on a stereoscopic display device (106). A system for representing and displaying a stereoscopic image (204) in a portable document format encoded file (112) includes an encoded file creator (116), an encoded file reader (118), a stereoscopic imager (120), and an image cache (121).

21 Claims, 7 Drawing Sheets

STEREOSCOPIC IMAGING IN A PORTABLE DOCUMENT FORMAT

CROSS-REFERENCE TO RELATED APPLICATION

This application is related to copending application Ser. No. 09/191,841, filed Nov. 13, 1998, which is incorporated by reference in its entirety.

TECHNICAL FIELD

The present invention relates generally to document imaging, and more particularly, to a system and method for providing stereoscopic imaging in a portable document format.

BACKGROUND ART

Stereoscopic imaging is the process of visually combining at least two images of a scene, taken from slightly different viewpoints, to produce the illusion of three-dimensional depth. This technique relies on the fact that human eyes are spaced some distance apart and do not, therefore, view exactly the same scene. By providing each eye with an image from a different perspective, the viewer's eyes are tricked into perceiving depth.

Typically, where two distinct perspectives are provided, the component images are referred to as the "left" and "right" images. For purposes of clarity, this terminology is used throughout the following discussion. However, those skilled in the art will recognize that more than two viewpoints may be combined to form a stereoscopic image.

Stereoscopic images may be produced by a computer using a variety of techniques. For example, the "anaglyph" method uses color to encode the left and right components of a stereoscopic image. Thereafter, a viewer wears a special pair of glasses that filters light such that each eye perceives only one of the views.

Similarly, page-flipped stereoscopic imaging is a technique for rapidly switching a display between the right and left views of an image. Again, the viewer wears a special pair of eyeglasses that contains high-speed electronic shutters, typically made with liquid crystal material, which open and close in sync with the images on the display. As in the case of anaglyphs, each eye perceives only one of the component images.

Other stereoscopic imaging techniques have been recently developed that do not require special eyeglasses or headgear. For example, lenticular imaging partitions two or more disparate image views into thin slices and interleaves the slices to form a single image. The interleaved image is then positioned behind a lenticular lens that reconstructs the disparate views such that each eye perceives a different view. Some lenticular displays are implemented by a lenticular lens positioned over a conventional LCD display, as commonly found on computer laptops.

Stereoscopic imaging thus provides a means for communicating three-dimensional information on a two-dimensional computer display, which is advantageous in a number of applications. For example, a radiologist can view a three-dimensional x-ray image in order to better diagnose a patient's condition.

Concurrently, but independent from the above, the recent explosive growth of the Internet has led to the need for a portable document format, or a document format for reliably exchanging and viewing any electronically-stored document, independent of the environment in which it was created. Currently, one popular format is the Hypertext Markup Language (HTML), which is used extensively by "web browsers" such as Netscape Navigator™ to display simple, on-line documents. As a portable document format, however, the simplicity of HTML is its weakness, since HTML is not well-suited to representing and displaying books and other complex, printed documents.

A more feature-rich document format is Postscript®, developed by Adobe Systems Incorporated. Unlike HTML, Postscript can readily represent complex documents, including books and the like. Moreover, Postscript is supported by numerous standard development tools, and is directly processed by many printers and imagesetters. However, as a portable document format, Postscript's files are typically larger than HTML files, which is a disadvantage for use over the Internet, and, additionally, are not organized for rapid interactive access.

To provide a document format more ideally suited for on-line use, Adobe Systems developed the "Portable Document Format" (PDF). Sharing the flexibility and power of Postscript, PDF files can be optimized to require substantially less disk space. Moreover, PDF files are configured to permit rapid interactive access.

Adobe Systems provides a number of tools for creating documents in the PDF format, such as PDF Writer™ and Acrobat Distiller™. Moreover, Adobe Systems provides a PDF reader/viewer called Acrobat™, which is freely available on the Internet. With Acrobat™, a user can view a file as it was intended to be displayed, independent of the application software, hardware, and operating system in use.

Despite PDF's ability to represent a variety of image types, no provision is made in PDF for stereoscopic images. Accordingly, what is needed is a system and method for providing stereoscopic imaging in a portable document format. Moreover, what is needed is a specification for a stereo-enhanced portable document format that is capable of representing a stereoscopic image. What is also needed is a stereo-enhanced portable document format reader for displaying a stereoscopic image. In addition, what is needed is a stereo-enhanced portable document format that may be read and displayed by a non-enhanced reader such as Adobe Acrobat.

DISCLOSURE OF INVENTION

The present invention solves the foregoing problems by providing a system and method for representing and displaying a stereoscopic image (204) in a portable document format encoded file (112).

In one aspect of the invention, a computer-implemented method for representing a stereoscopic image (204) in a portable document format encoded file (112) includes receiving at least two component images (110A–B) combinable to form the stereoscopic image (204); encoding the component images (110A–B) in a portable document format; associating each of the component images (110A–B) with a stereoscopic indicator (302); and storing the component images (110A–B) and associated stereoscopic indicators (302) in the encoded file (112).

In another aspect of the invention, a computer implemented method for displaying a stereoscopic image (204) represented in a portable document format encoded file (112) includes identifying in the encoded file (112) at least two component images (110A–B) combinable to create the stereoscopic image (204); combining the component images (110A–B) to create the stereoscopic image (204); and displaying the stereoscopic image (204) on a stereoscopic display device (106).

In yet another aspect of the invention, a system (100) for representing a stereoscopic image (204) in a portable document format encoded file (112) includes a computer-readable medium (108) for storing at least two component images (110A–B) combinable to form the stereoscopic image (204); an encoded file creator (116), coupled to the computer-readable medium (108), for receiving the at least two component images (110A–B), for encoding the component images (110A–B) in a portable document format, for associating each of the component images (110A–B) with a stereoscopic indicator (302), and for storing the component images (110A–B) and associated stereoscopic indicators (302) in the encoded file (112).

In still another aspect of the invention, a system (100) for displaying a-stereoscopic image (204) represented in a portable document format encoded file (112) includes a computer-readable medium (108) for storing the encoded file (112), the encoded file (112) comprising at least two encoded component images (110A–B) combinable to form a stereoscopic image (204), the encoded component images (110A–B) further comprising stereoscopic indicators (302); an encoded file reader (118), coupled to the computer-readable medium (108), for identifying in the encoded file (112), responsive to the stereoscopic indicators (302), the at least two component images (110A–B); a stereoscopic imager (120), coupled to the encoded file reader (118), for combining the component images (110A–B) to create the stereoscopic image (204), and for displaying the stereoscopic image (204) on a stereoscopic display device (106); and an image cache (121), coupled to the encoded file reader (118), for storing a first component image (110A,B) while the encoded file reader (118) locates a second, counterpart component image (110A,B).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

A preferred embodiment of the present invention is now described with reference to the Figures, where like reference numbers indicate identical or functionally similar elements. Also in the Figures, the left most digit of each reference number corresponds to the Figure in which the reference number is first used.

Although the following description is made in the context of a specific portable document format developed by Adobe Systems, i.e. PDF, those skilled in the art will recognize that the method and system disclosed herein apply equally to other portable document formats. Moreover, as noted above, the components of a stereoscopic image are referred to herein as the "left" and "right" component images. However, it should be recognized that stereoscopic images may include more than two viewpoints within the scope of the present invention with modifications apparent to those skilled in the art.

System Architecture

Figure 1A:
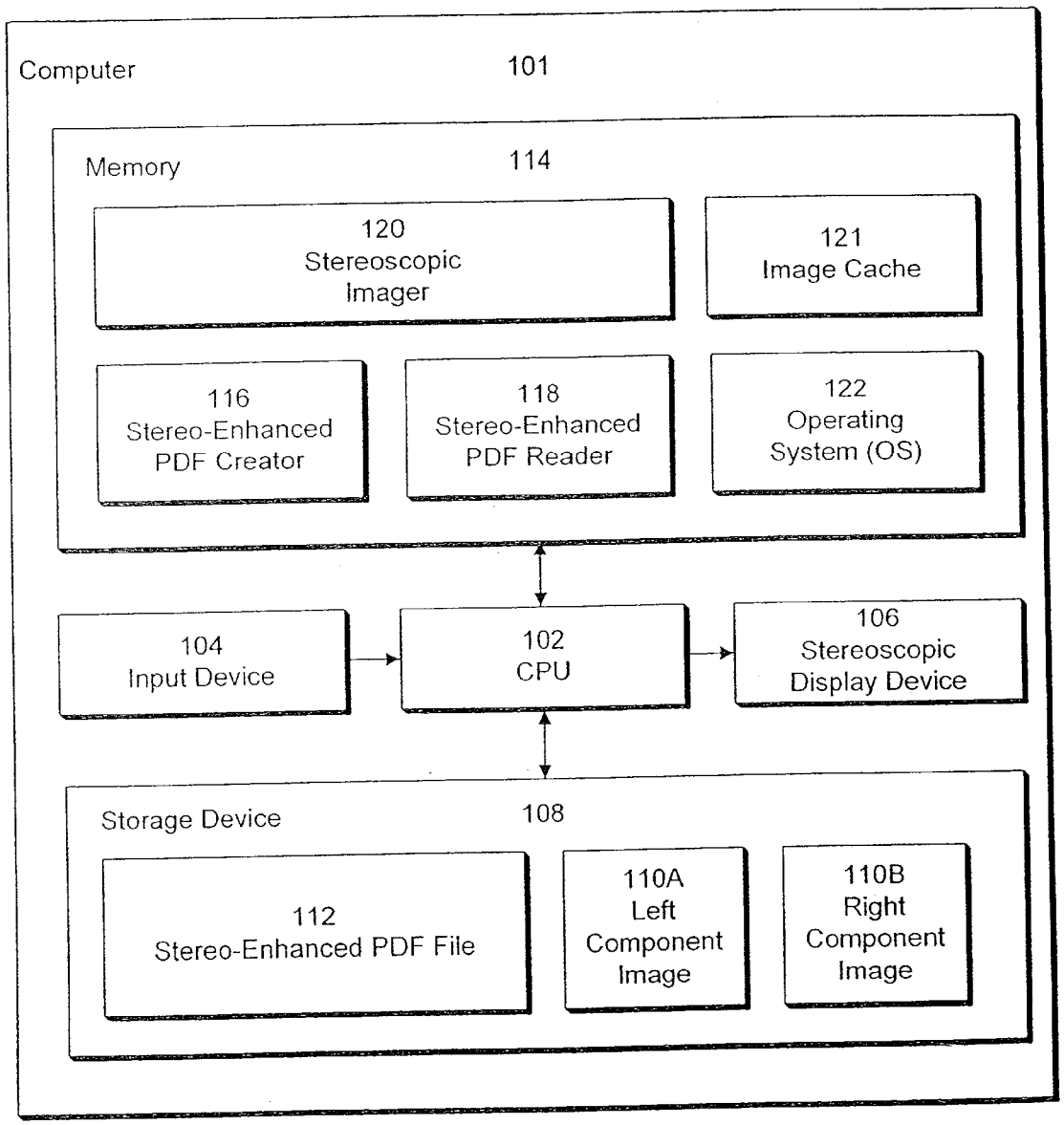
FIG. 1A is a block diagram of a system for providing stereoscopic imaging in a portable document format according to one embodiment of the present invention.

Referring now to FIG. 1A, there is shown a block diagram of a system 100 for providing stereoscopic imaging in a portable document format. In one embodiment, the system 100 is implemented as software running on a conventional personal computer 101, such as an IBM® PC compatible. Thus, the hardware architecture of the system 100 as shown in FIG. 1A may be implemented as a combination of components of such computer 101, although other implementations are possible. For example, the present invention may also be implemented in an embedded system.

A central processing unit (CPU) 102 executes software instructions and interacts with other system components to perform the methods of the present invention. An input device 104, such as a mouse-type controller or keyboard, facilitates user control of the operation of the system 100. A stereoscopic display device 106 displays text and 2D graphics, as well as stereoscopic images, under the control of the CPU 102.

Figure 1B:
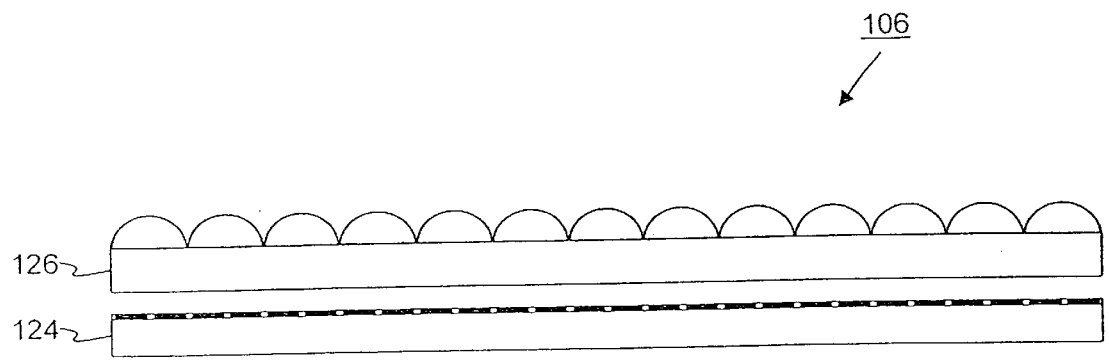
FIG. 1B is a cross-sectional view of a stereoscopic display device according to one embodiment of the present invention.

In one embodiment, as illustrated in FIG. 1B, the stereoscopic display device 106 is implemented as a flat panel LCD display 124, such as those commonly available in laptop or portable computers. Positioned over the LCD display 124 is a lenticular lens 126, which is used to reconstruct a lenticular stereoscopic image from two or more disparate views such that each eye perceives a different view. Lenticular lenses 126 are available from a variety of sources, including the Lenticular Corporation of Sun Prairie, Wis.

Figure 1C:
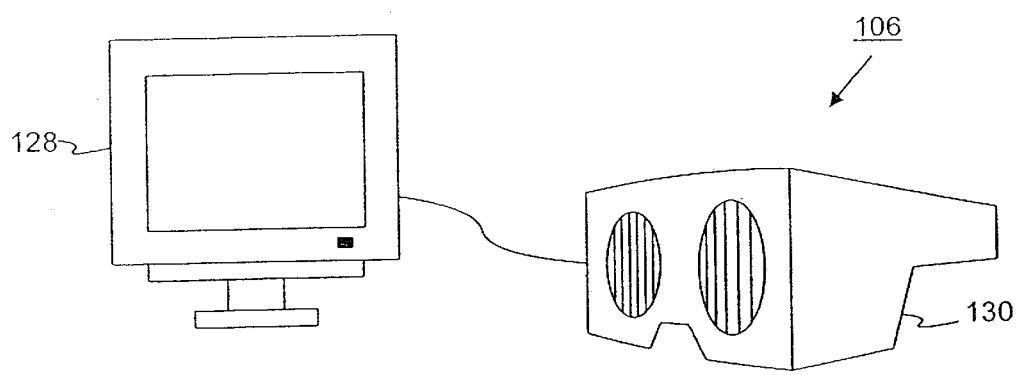
FIG. 1C is an illustration of an alternative stereoscopic display device according to one embodiment of the present invention.

In an alternative embodiment, as illustrated in FIG. 1C, the stereoscopic display device 106 is implemented as a conventional cathode-ray tube (CRT) 128 in combination with a pair of shutter glasses 130. Cathode-ray tubes 128 are widely available, and shutter glasses may be obtained from such manufacturers as VRex, Inc. of Elmsford, N.Y.

Referring again to FIG. 1A, the system 100 also includes a storage device 108 that provides long-term storage of data and software programs, and may be implemented as a hard disk drive or other suitable mass storage device. In one embodiment, the-storage device 108 includes at least one pair of component images 110A–B, and may be used to store one or more stereo-enhanced PDF files 112, which are generated by the system and method disclosed herein.

The system 100 also includes an addressable memory 114 for storing software instructions to be executed by the CPU 102. The memory 114 is implemented using a standard memory device, such as a random access memory (RAM). In one embodiment, the memory 114 stores a number of software objects or modules, including a stereo-enhanced PDF creator 116, a stereo-enhanced PDF reader 118, and a stereoscopic imager 120. Throughout this discussion, the foregoing objects or modules are assumed to be separate functional units, but those skilled in the art will recognize that the functionality of various units may be combined or integrated without departing from the spirit of the invention.

In one embodiment, the stereo-enhanced PDF creator 116 may be implemented as a modified version of Adobe Systems' PDF Writer™ or Acrobat Distiller™. Likewise, the stereo-enhanced PDF reader 118 may be implemented as a standard Adobe Acrobat reader in combination with a customized "plug-in" module using the Acrobat Viewer Plug-in Application Program Interface (API). Alternatively, the system 100 may interact with a standard Acrobat reader using interapplication communication (IAC), dynamic data exchange (DDE), object linking and embedding (OLE), or ActiveX, all of which are well known to those of skill in the art.

In one embodiment, the memory also includes an image cache 121, which is used to temporarily store a component image 110A,B while a counterpart image 110A,B is being located by the PDF reader 118. The operation of the image cache 121 is described in greater detail below with respect to FIG. 4B. In addition, the memory 114 includes an operating system (OS) 122 for managing the above-mentioned software objects. Preferably, Windows 95, available from Microsoft Corporation, is used, although a variety of other operating systems 122, such as Windows NT or MacOS 8, may be used within the scope of the present invention.

System Dataflow

Figure 2:
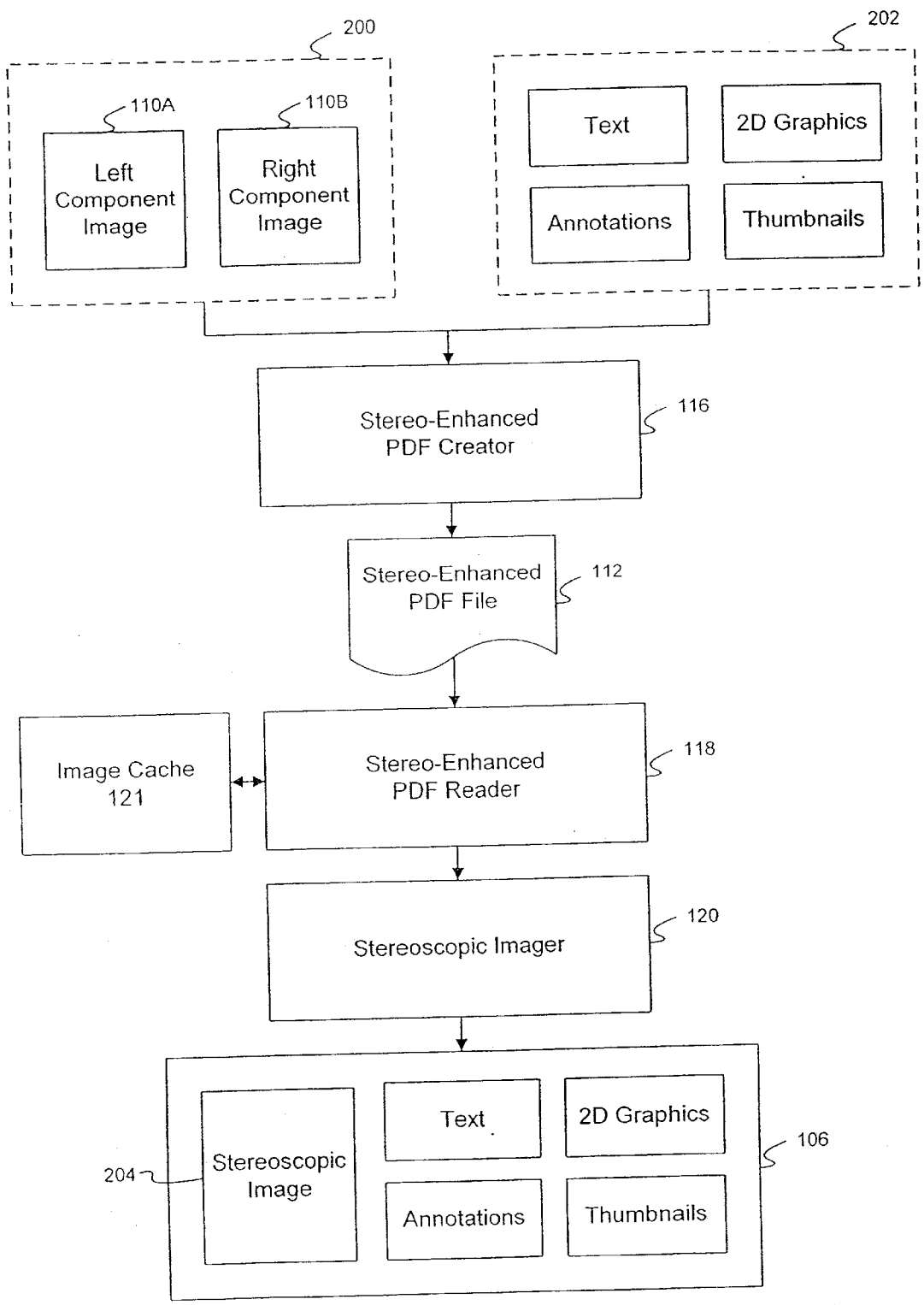
FIG. 2 is a dataflow diagram for representing and displaying a stereoscopic image in a portable document format encoded file according to one embodiment of the present invention.

Referring now to FIG. 2, there is shown a dataflow diagram of the system 100 in accordance with an embodiment of the present invention. Initially, stereoscopic data 200 and non-stereoscopic data 202 are provided to the stereo-enhanced PDF creator 116. In one embodiment, stereoscopic data 200 includes at least one pair of component image 110A–B. Non-stereoscopic data 202, on the other hand, includes text, 2D images, annotations, thumbnails, and other data objects capable of being represented in a conventional PDF file.

The stereo-enhanced PDF creator 116 generates from the stereoscopic 200 and non-stereoscopic 202 data a stereo-enhanced PDF file 112. In most respects, the stereo-enhanced PDF file 112 has the same structure and format as a conventional PDF file, and may be read and displayed by a standard Acrobat reader. However, as described below, the enhanced file 112 includes a plurality of non-standard, stereoscopic indicators that identify selected images as stereoscopic images 204. In one embodiment, the indicators are non-standard "keys", which are key/value pairs in the definition of a PDF object. Alternatively, the indicators may be implemented as annotation objects or the like. In one embodiment, the stereoscopic indicators identify a PDF image as either a left or right component image 110A–B, and may further indicate the method by which the images are to be combined, as described more fully hereafter.

The stereo-enhanced PDF file 112 is then provided to a stereo-enhanced PDF reader 118, which is similar in most respects to a standard Acrobat reader except that it includes additional functionality to identify and process stereoscopic indicators. If an image with a stereoscopic indicator is found, the reader 118 attempts to find a counterpart image with a stereoscopic indicator. The image cache 121 is used in one-embodiment to temporarily store a component image 110A,B until its counterpart is found.

After both component images 110A–B are identified, the pair is provided to the stereoscopic imager 120. The imager 120 combines the component images 110A–B using either a default or specified stereoscopic imaging method. Techniques for generating stereoscopic images 204 from component images 110A–B are well known to those skilled in the art. After the stereoscopic image 204 is generated, it is displayed on the stereoscopic display device 106, in addition to the conventional, non-stereoscopic content of the page.

Portable Document Format Specification

One aspect of the present invention is an extension to a portable document format, such as Adobe Systems' PDF version 1.2, for representing a stereoscopic image 204. The complete specification for PDF version 1.2 may be obtained from Adobe Systems' website at www.adobe.com, in the subdirectory "supportservice/devrelations/PDFS/TN/PDFSPEC.PDF". A brief description of PDF version 1.2 is now provided in order to provide a framework for the format extensions described thereafter. It should be noted, however, that portable document formats other than Adobe Systems' PDF may be used without departing from the spirit of the invention.

Figure 3A:
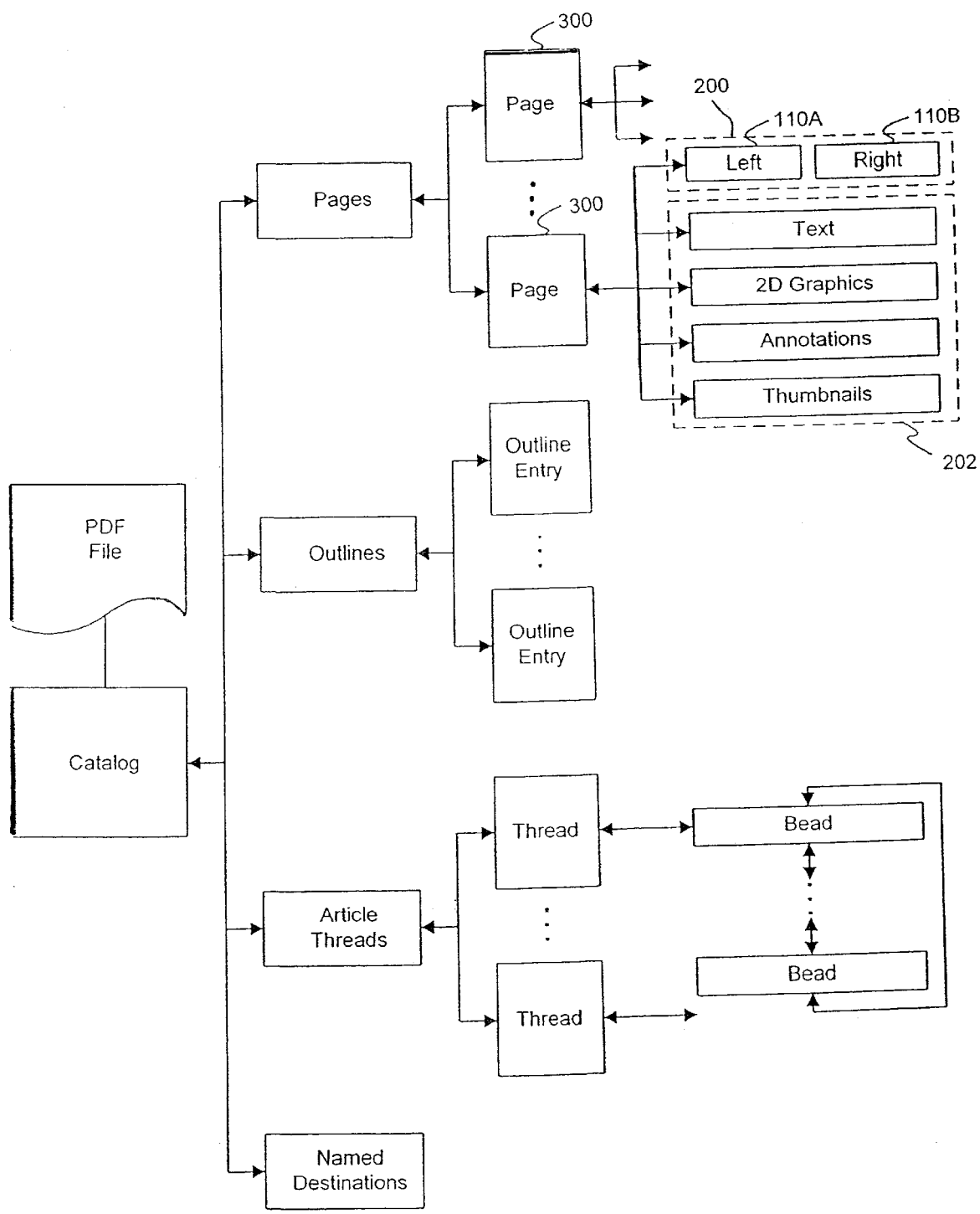
FIG. 3A is an illustration of the structure of a portable document format encoded file according to one embodiment of the present invention.

As explained above, PDF is an electronic file format used to represent a document in a manner independent of the application software, hardware, and operating system used to create it. As illustrated in FIG. 3A, a PDF "document" can be described as a hierarchy of objects contained within the body of the PDF file.

Typically, a PDF document contains one or more page objects 300. Each page object 300 represents an imagable page of the PDF document, and contains a combination of additional objects including, for example, text, graphics, annotations, thumbnails, and the like. The display characteristics of each page object 300 are defined by a plurality of "keys", which are keyword/value pairs that define the attributes of the displayed page. For example, the key, "/mediabox [0 0 612 792]", defines the dimensions of the page.

Stereo-Enhanced PDF Specification

An extension to the PDF specification is now described for representing a stereoscopic image 204 in a stereo-enhanced PDF file 112. In one embodiment, a page may contain both stereoscopic 200 and non-stereoscopic 202 data. Stereoscopic data 200 includes at least one left component image 110A and at least one right component image 110B, which, when combined by the stereoscopic imager 120, form a stereoscopic image 204. Non-stereoscopic data 202, on the other hand, includes text, 2D images, annotations, thumbnails, and other data objects capable of being represented in a standard PDF file.

Figure 3B:
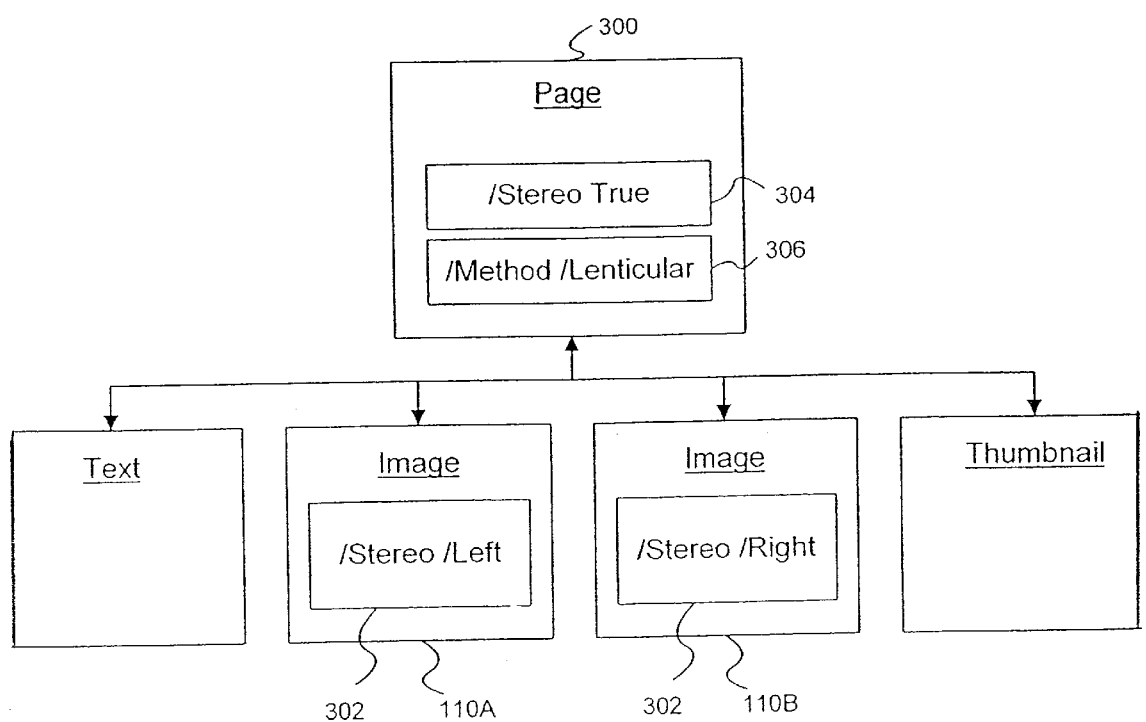
FIG. 3B is an illustration of a number of key extensions in a portable document format for representing a stereoscopic image according to one embodiment of the present invention.

As illustrated in FIG. 3B, stereoscopic data 200 is identified in the stereo-enhanced PDF file 112 by a number of stereoscopic indicators 302. In one embodiment, the stereoscopic indicators 302 are PDF keys, although annotation objects or other similar indicators could be used without departing from the spirit of the invention.

In one embodiment, a stereoscopic indicator 302 is associated with each of the left component images 110A. The key/value pair for this indicator 302 is "/Stereo /Left", although those skilled in the art will recognize the particular names of the key/value pairs are not crucial to the invention. Likewise, a stereoscopic indicator 302 is associated with each of the right component images 110B. In this case, the key/value pair is "/Stereo /Right". An example of a PDF object for a left component image 110A containing a stereoscopic indicator 302 is provided below.

```
5 0 obj
<<
/Type /Xobject
/Subtype /Image
/Name /Im0
/Width 24
/Height 23
/BitsPerComponent 8
/ColorSpace /DeviceRGB
/Filter /ASCIIHexDecode
/Length 6 0 R
/Stereo /Left
>>
stream
003B00   002700  002480  0E4940    114920  14B220  3CB650
75FE88   17FF8C  175F14  1C07E2    383C43  703182  F8EDFC
B2BBC2   BB6F84  31BFC1  18EA3C    0E3CE3  07FC00  03F800
1E1800 1FF800>
endstream
endobj
```

In one embodiment, a stereoscopic enabler 304 is associated with each of the page objects 300 that contain stereoscopic data 200. The stereoscopic enabler 304 is a key/value pair such as "/Stereo True". In an alternative embodiment, however, the enabler 304 may be an annotation or other suitable indicator.

The purpose of the enabler 304 is to alert the stereo-enhanced PDF reader 118 that a stereoscopic image 204 is contained within the current page, permitting the reader 118 to immediately launch and/or interface with the stereoscopic imager 120. Additionally, as described below with reference to FIG. 4B, if a stereoscopic enabler 304 is not found in the definition of the page object 300, the associated page may be decoded and displayed using conventional PDF imaging techniques. This allows the system 100 to quickly process the page, possibly using a standard Acrobat reader, without the need to check individual images for stereoscopic indicators 302. It should be recognized, however, that the enabler 304 is optional in one embodiment, since the stereoscopic indicators 302, themselves, may be used to signal that a page contains stereoscopic data 200. An example of a page object 300 that includes a stereoscopic enabler 304 is provided below.

```
3 0 obj
<<
/Parent 4 0 R
/MediaBox [0 0 612 792]
/Resources <<
/Font <</F3 7 0 R /F5 9 0 R /F7 11 0 R >>
/ProcSet [/PDF] >>
/Thumb 12 0 R
/Contents 14 0 R
/Annots [23 0 R 24 0 R]
```

-continued

```
/Stereo True
/Method /Lenticular
>>
endobj
```

In one embodiment, a page object 300 may also include a method indicator 306, which is used to specify the stereoscopic imaging method to be used when combining the left and right component images 110A–B. The method indicator 306 is implemented as a key/value pair in one embodiment, although other mechanisms could be used.

A variety of Methods are possible within the scope of the present invention. For example, the key/value pair, "/Method /Lenticular", indicates lenticular imaging. Alternative imaging methods include anaglyph imaging, page-flipped stereoscopic imaging, and the like. The page object 300 definition shown immediately above includes an example of a method indicator 306.

With few exceptions, adding custom keys to a standard PDF object does not interfere with the processing of the PDF file by a non-enhanced reader such as Acrobat. Thus, a standard Acrobat reader will simply ignore the above-described key extensions and display the left and right component images 110A–B as separate images, on the same or different pages depending on the PDF encoding parameters.

To permit interoperability between vendors and to avoid name collisions, Adobe Systems provides a name registry system as described in Appendix F of the Portable Document Format Reference Manual, Version 1.2, Nov. 27, 1996, available for download at the address provided above. The registry system requires submission of a new key to Adobe Systems for approval. Thus, the available key/value pairs may vary from those described above according to the requirements of Adobe Systems, and are not, therefore, crucial to the present invention.

For purposes of the following discussion, a PDF-encoded file having the above-described structure and key extensions is referred to herein as a stereo-enhanced PDF file 112.

Method of Operation
Representing a Stereoscopic Image 204 In a Stereo-Enhanced PDF File 112

Figure 4A:
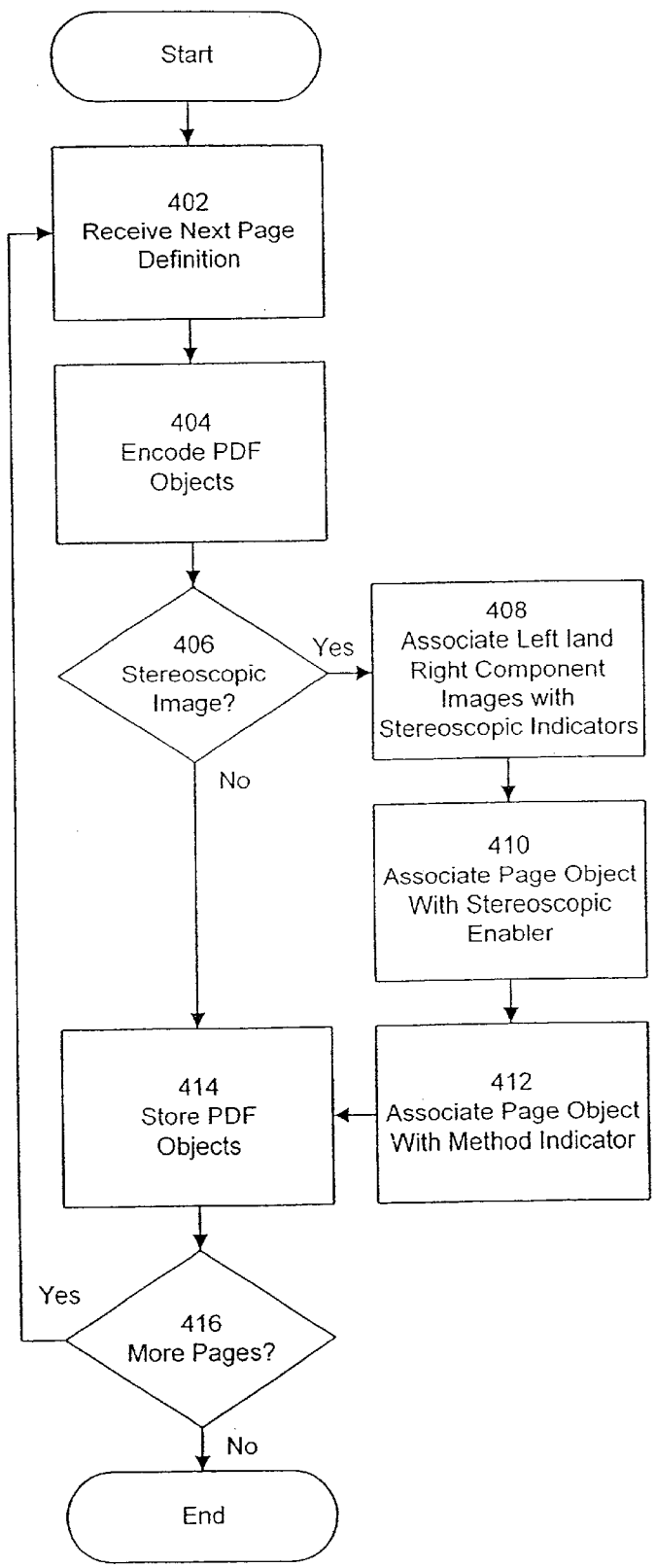
FIG. 4A is a flow chart of a method for representing a stereoscopic image in a portable document format encoded file according to one embodiment of the present invention.

Referring now to FIG. 4A, there is shown a flow chart of a method for representing a stereoscopic image 204 in a stereo-enhanced PDF file 112. In one embodiment, the process of representing the stereoscopic image 204 is performed by the stereo-enhanced PDF creator 116, which may be implemented as a modified version of Adobe Systems' PDF Writer or Acrobat Distiller. Therefore, in one embodiment, the method steps described hereafter are performed in conjunction with processing by such standard PDF creation tools.

The method begins by receiving 402 the next page definition from a source tool, such as a word processor or PDF creation program. A page definition comprises the content and layout of all of the objects that will make up a page in PDF file 112, including text, 2D graphics, annotations, and thumbnails, as well as stereoscopic images 204.

The source tool should be capable of annotating or flagging an image as a component image 110A,B. For example, if the source tool is a custom PDF creation program, the left and right components 110A–B of each stereoscopic image 204 may be easily tagged or marked using any number of conventional techniques well known to those skilled in the art.

After the page definition is received, the method continues by encoding 404 PDF objects according to the page definition using standard PDF encoding techniques. Thereafter, a determination 406 is made whether any of the images in the page definition were tagged as component images 110A–B. If so, the method continues by associating 408 the left and right component images 110A–B with stereoscopic indicators 302.

As previously explained, a stereoscopic indicator 302 is a key/value pair in the definition of a PDF image object. In the case of the left component image 110A, the indicator 302, "/Stereo /Left", is used. Similarly, in the case of a right component image 110B, the indicator 302 is "/Stereo /Right".

Next, the method continues by associating 410 the page object 410 including the image components 110A–B with a stereoscopic enabler 304. In one embodiment, the stereoscopic enabler 304 is a key/value pair in the definition of the page object 300, such as "/Stereo True".

Thereafter, the method continues by associating 412 a method indicator 306 with the page object 300 that includes the component images 110A–B. As noted above, the method indicator 306 is used to specify the stereoscopic imaging method for combining the left and right component images 110A–B to form the stereoscopic image 204. In one embodiment, the method indicator 306 is selected by the user when creating the page definition. For example, using a custom PDF creation tool, a tag or field may be defined for the desired stereoscopic imaging method. If no method is specified, a default method will be used in combining the component images 110A–B.

In one embodiment, the method indicator 306 is implemented as a key/value pair within the definition of a page object 300. A variety of stereoscopic imaging methods are possible within the scope of the present invention. For example, the key/value pair, "/Method /Lenticular", indicates lenticular imaging. Alternative methods include anaglyph imaging, page-flipped stereoscopic imaging, and the like. In an alternative embodiment, the method indicator 306 is associated with the component images 110A–B, themselves, allowing a plurality of imaging methods in a single page.

After either steps 406 or 412, the method continues by storing 414 in the stereo-enhanced PDF file 112 the PDF objects for the current page, including the stereoscopic indicators 302, the stereoscopic enabler 304, and the method indicator 306. In certain embodiments, step 414 is delayed until all of the pages have been processed, after which all of the PDF objects are written at one time to the stereo-enhanced PDF file 112 in the storage device 108.

A determination is then made whether more pages in the page source need to be processed. If so, the method returns to step 402 to receive the next page definition; otherwise, is the method is complete.

Displaying a Stereoscopic Image 204 Represented in a Stereo-Enhanced PDF File 112

Figure 4B:
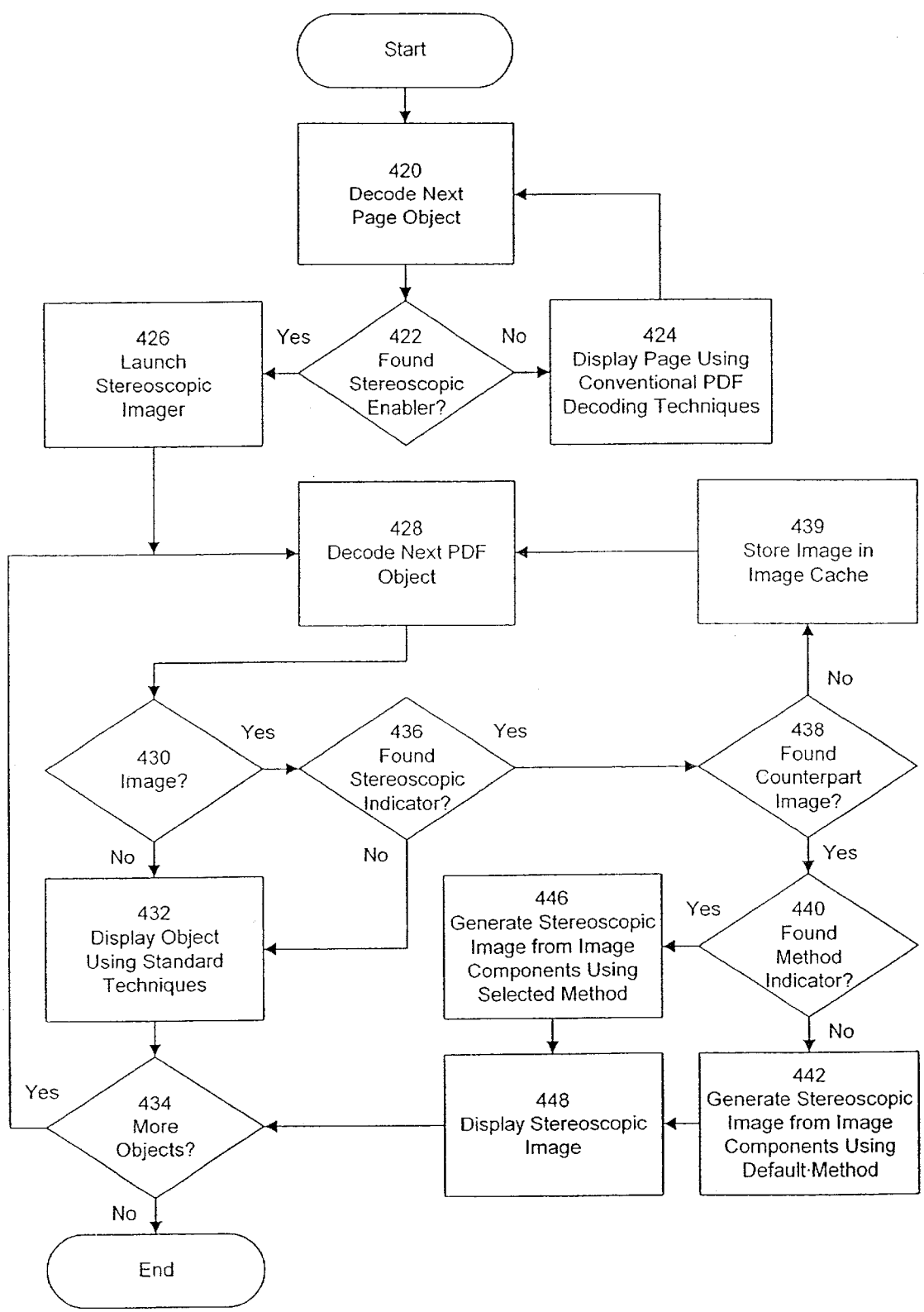
FIG. 4B is a flow chart of a method for displaying a is stereoscopic image represented in a portable document format encoded file according to an embodiment of the present invention.

Referring now to FIG. 4B, there is shown a method for displaying a stereoscopic image 204 represented in a stereo-enhanced PDF file 112. In one embodiment, the process of displaying the stereoscopic image 204 is performed by the stereo-enhanced PDF reader 118, which may be implemented as a standard Acrobat reader in conjunction with a custom "plug-in" module. Therefore, in one embodiment, the method steps described hereafter are performed in connection with processing by a standard PDF reader.

The method begins by decoding 420 the next PDF page object 300 in the stereo-enhanced PDF file 112 using conventional techniques. The particular object 300 decoded depends on the context. For example, when the PDF file 112 is first opened and read by the PDF reader 118, the page object 300 corresponding to the first page in the PDF document is decoded. Likewise, a user may select various pages by pressing the "Page Down" key, selecting a bookmark, following a hyperlink, or the like, after which the corresponding page object 300 is decoded by the PDF reader 118.

After the page object 300 is decoded, a determination 422 is made whether the page object 300 includes a stereoscopic enabler 304. If a stereoscopic enabler 304 is not found in the definition of the page object 300, the method continues by displaying 424 the page object 300 and its contents using conventional PDF imaging techniques. This allows the system 100 to quickly process the page, possibly using a standard Acrobat reader, without the need to check individual images for stereoscopic indicators 302. After the page is displayed, the method returns to step 420 to receive the next page object 300. In an alternative embodiment, however, the stereoscopic enabler 304 is not required, and the method continues at step 428, with the stereoscopic imager 120 being loaded only after a pair of component images 110A–B is identified.

If, however, a stereoscopic enabler 304 found to be associated with the image, the method continues by launching the stereoscopic imager 120. In one embodiment, the stereoscopic imager 120 is a separate thread in a multi-threaded environment provided by the operating system 122. In certain embodiments, only a single stereoscopic imager 120 is used, which is capable of handling a variety of stereoscopic imaging methods. However, as described below, a plurality of imagers 120, each providing a single imaging method, may also be used.

After the imager 120 is launched, the method continues by decoding 428 the next PDF object in the page using standard PDF decoding techniques. A determination 430 is then made whether the decoded object is an image. If not, the object is displayed 432 using standard PDF imaging techniques, after which the method continues at step 434.

If, however, the decoded object is an image, a check 436 is made whether the image is associated with a stereoscopic indicator 302, which would identify the image as either a left or right component image 110A–B. If there is no stereoscopic indicator 302 in the definition of the image, the image is a 2D or non-stereoscopic image, and the method continues with step 432 by displaying the image using standard imaging methods.

If, however, the image includes a stereoscopic indicator 302, the method continues by checking 438 whether the counterpart image or images of the decoded image object were previously found. This is accomplished by searching the image cache 121 for the counterpart image or images.

For example, if the currently decoded object is a left component image 110A, then a search is made in the image cache 121 for the right component image 110B. Images in the cache 121 continue to be associated with their stereoscopic indicators 302 for identification purposes. In an embodiment in which more than two images are required to generate a stereoscopic image 204, each of the counterpart component images must be found in order to satisfy check in step 438. If one or more of the counterpart images were not previously found, the method continues by storing 439 the currently decoded image object in the image cache 121, along with its stereoscopic indicator 302.

If, however, the counterpart image or images were previously found, a determination 440 is made whether a method indicator 306 is found in the page object 300 associated with the component images 110A–B. As noted earlier, a method indicator 306 specifies the stereoscopic imaging method to be used when combining the left and right component images 110A–B to form the stereoscopic image 204.

In one embodiment, a default imaging method is provided, and may be pre-selected by the user. For example, in a system 100 with a lenticular stereoscopic display device 106, the default method may be lenticular imaging. If no method indicator 306 is found, the method continues by generating 442 the stereoscopic image 204 from the image components 110A–B using the default method. Techniques for generating stereoscopic images 204 from component images 110A–B are well known to those skilled in the art. If, however, a method indicator 306 is found, the method continues by generating 446 the stereoscopic image 204 from the image components 110A–B using the specified method.

The ability to specify a stereoscopic imaging method allows considerable flexibility in providing different types of stereoscopic imaging in the same PDF document. A system 100 may include, for example, a lenticular display device 106 and specify lenticular imaging as the default stereoscopic imaging method. Nevertheless, a user could additionally wear special eyeglasses or headgear to view an anaglyph or a paged-switched stereoscopic image if the appropriate method indicator 306 is provided.

In an alternative embodiment, the method indicators 306 are associated with individual component images 110A–B, permitting multiple stereoscopic imaging methods in a single page. Additionally, in one embodiment, the launching of the stereoscopic imager 120 may be deferred until step 446 in order to determine which of a plurality of imagers 120 to use in generating the stereoscopic image 204. For example, different stereoscopic imagers 120 may be used for generating anaglyphs and lenticular images, which imagers 120 are selectively loaded at runtime according to the specified method.

After either step 442 or 446, the generated stereoscopic image 204 is displayed on the stereoscopic display device 106. Thereafter, the method continues with step 434 by checking 434 whether more objects associated with the current page object 300 need to be decoded. If so, the method returns to step 428 to decode the next PDF object; otherwise, the method is complete.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer-implemented method for storing a stereoscopic image in a page object of a file encoded with a portable document format, the method comprising:
    encoding a non-image component in the portable document format and storing the encoded non-image component in the page object;
    receiving at least one non-stereoscopic image;
    encoding the non-stereoscopic image in the portable document format;
    associating the non-stereoscopic image with a non-stereoscopic indicator;
    storing the encoded non-stereoscopic image and the associated non-stereoscopic indicator in the page object;
    receiving at least two component images combinable to form the stereoscopic image;
    encoding the component images in the portable document format;
    associating each of the component images with a stereoscopic indicator which is different from the non-stereoscopic indicator;
    storing the encoded component images and associated stereoscopic indicators in the page object; and
    associating the page object with a stereoscopic enabler indicative that a stereoscopic image is contained within the page and enabling a page reader to initially launch or interface with a stereoscopic imager, whereby the absence of the stereoscopic indicator is indicative that the page may be read using conventional techniques associated with the portable document format.

2. The method of claim 1, wherein the component images comprise left and right component images, and the step of associating each of the component images comprises the sub-steps of:
    associating each left component image with a stereoscopic indicator of a left component image; and
    associating each right component image with a stereoscopic indicator of a right component image.

3. The method of claim 1, wherein at least one stereoscopic indicator is a key/value pair in a portable document format.

4. The method of claim 1, wherein at least one stereoscpic indicator is an annotation object in a portable document format.

5. The method of claim 1, wherein the component images are combinable to form a stereoscopic image selected from the group consisting of an anaglyph, a page-switched image, and a lenticular image.

6. The method of claim 1, further comprising the step of:
    associating the component images with at least one method indicator of the method by which the component images are combined to form the stereoscopic image.

7. The method of claim 1, further comprising the step of: associating the page object with a method indicator of a method by which the component images are combined to form the stereoscopic image.

8. A computer-implemented method for displaying a stereoscopic image together with a non-stereoscopic image component and a non-image component based on data stored in a page object of a file encoded in a portable document format, the method comprising:
    identifying in the encoded file the non-image component, the non-stereoscopic image component, and at least two component images combinable to create the stereoscopic image;
    combining the component images to create the stereoscopic image; and
    displaying the stereoscopic image together with the non-image component and the non-stereoscopic image component on a stereoscopic display device;
    wherein in said identifying step, the non-stereoscopic image component is identified based on detection of a non-stereoscopic indicator, and the stereoscopic image component is identified based on detection of a stereoscopic indicator which is different from the non-stereoscopic indicator; and wherein the page object is associated with a stereoscopic enabler indicative that a stereoscopic image is contained within the page and enabling a page reader to initially launch or interface with a stereoscopic imager, whereby the absence of the stereoscopic indicator is indicative that the page may be read using conventional techniques associated with the portable document format.

9. The method of claim 8, wherein the identifying step comprises the sub-steps of:

decoding a first image in the page object of the encoded file;

responsive to the first image being associated with a stereoscopic indicator, decoding a second image in the encoded file; and responsive to the second image being associated with a stereoscopic indicator, identifying the first and second images as the component images.

10. The method of claim 9, wherein the first image is a left component image and the second image is a right component image.

11. The method o f claim 9, wherein at least one stereoscopic indicator is a key/value pair in a portable document format.

12. The method of claim 9, wherein at least one stereoscopic indicator is an annotation object in a portable document format.

13. The method of claim 8, wherein the identifying step comprises the sub-steps of:

decoding a first image in the page object of the encoded file; and responsive to the first image being associated with a stereoscopic indicator searching an image cache for a counterpart image, the counterpart image being combinable with the first image to create a stereoscopic image;

responsive to the counterpart image not being found in the image cache, storing the first image in the image cache; and responsive to the counterpart image being found in the image cache, identifying the first image and counterpart image as the component images.

14. The method of claim 8, wherein the component images are combinable to form a stereoscopic image taken from the group consisting of an anaglyph, a page-switched image, and a lenticular image.

15. The method of claim 8, wherein the combining step comprises the sub-steps of:

determining whether the component images are associated with a method indicator specifying a stereoscopic imaging method;

responsive to a method indicator being associated with the component images, combining the component images according to the stereoscopic imaging method specified in the method indicator; and responsive to a method indicator not being associated with the component images, combining the component images according to a default stereoscopic imaging method.

16. The method of claim 8, wherein the identifying, combining, and displaying steps are performed only when a stereoscopic enabler is found in the page object.

17. A system for storing a stereoscopic image in a page object of a file encoded in a portable document format, the system comprising:

a computer-readable medium for storing data for at least two component images combinable to form the stereoscopic image, for storing data encoding a non-stereoscopic image component, and for storing data encoding a non-image component;

an encoded file creator, coupled to the computer-readable medium, for storing a stereoscopic image in a page object of a file encoded with a portable document format by encoding a non-image component in the portable document format and storing the encoded non-image component in the page object, receiving at least one non-stereoscopic image, encoding the non-stereoscopic image in the portable document format, associating the non-stereoscopic image with a non-stereoscopic indicator, storing the encoded non-stereoscopic image and the associated non-stereoscopic indicator in the page object, receiving at least two component images combinable to form the stereoscopic image, encoding the component images in the portable document format, associating each of the component images with a stereoscopic indicator which is different from the non-stereoscopic indicator, storing the encoded component images and associated stereoscopic indicators in the page object, and associating the page object with a stereoscopic enabler indicative that a stereoscopic image is contained within the page and enabling a page reader to initially launch or interface with a stereoscopic imager, whereby the absence of the stereoscopic indicator is indicative that the page may be read using conventional techniques associated with the portable document format.

18. The system of claim 17, wherein at least one stereoscopic indicator is selected from the group consisting of portable document format key/value pair and a portable document format annotation object.

19. The system for displaying a stereoscopic image together a non-stereoscopic image component and with a non-image component based on data stored in a page object of a file encoded in a portable document format, the system comprising:

a computer-readable medium for storing the encoded file, the encoded file comprising data for at least two encoded component images combinable to for a stereoscopic image, the encoded component images further comprising stereoscopic indicators, data for the non-stereoscopic image component, and data for the non-image component;

an encoded file reader, coupled to the computer-readable medium, for identifying in the encoded file, responsive to the stereoscopic indicators, the at least two component images;

a stereoscopic imager, coupled to the encoded file reader, for combining the component images to create the stereoscopic image, and for displaying the stereoscopic image together with the non-image component and the non-stereoscopic image component on a stereoscopic display device;

wherein in said identifying step, the non-stereoscopic image component is identified based on detection of a non-stereoscopic indicator, and the stereoscopic image component is identified based on detection of a stereoscopic indicator which is different from the non-stereoscopic indicator; and wherein the page object is associated with a stereoscopic enabler indicative that a stereoscopic image is contained within the page and enabling a page reader to initially launch or interface with a stereoscopic imager, whereby the absence of the stereoscopic indicator is indicative that the page may be read using conventional techniques associated with the portable document format.

20. The system of claim 19, further comprising:

an image cache, coupled to the encoded file reader, for storing a first component image while the encoded file reader locates a second, counterpart component image.

21. The system of claim 20, wherein at least one stereoscopic indicator is selected from the group consisting of a portable document format key/value pair and a portable document format annotation object.

* * * * *

UNITED STATES PATENT AND TRADEMARK OFFICE
CERTIFICATE OF CORRECTION

PATENT NO.   : 6,631,205 B1
DATED        : October 7, 2003
INVENTOR(S)  : Roger D. Melen et al.

It is certified that error appears in the above-identified patent and that said Letters Patent is hereby corrected as shown below:

Column 3,
Line 15, "a-stereoscopic" should read -- a stereoscopic --; and
Line 66, the second occurrence of "is" should be deleted.

Column 5,
Line 42, "are.provided" should read -- are provided --.

Column 6,
Line 6, "one-embodiment" should read -- one embodiment --; and
Line 64, "the.spirit" should read -- the spirit --.

Column 9,
Line 18, "object 410" should read -- object --; and
Line 55, "is" should be deleted.

Column 10,
Line 27, "found" should read -- is found --.

Column 12,
Line 31, "stereoscpic" should read -- stereoscopic --.

Column 13,
Line 22, "o f" should read -- of --.

UNITED STATES PATENT AND TRADEMARK OFFICE
CERTIFICATE OF CORRECTION

PATENT NO. : 6,631,205 B1
DATED : October 7, 2003
INVENTOR(S) : Roger D. Melen et al.

It is certified that error appears in the above-identified patent and that said Letters Patent is hereby corrected as shown below:

Column 14,
Line 40, "together a" should read -- together with a --; and
Line 48, "for" should read -- form --.

Signed and Sealed this

Sixteenth Day of March, 2004

JON W. DUDAS
*Acting Director of the United States Patent and Trademark Office*